United States Patent [19]

Takezawa et al.

[11] B 3,914,535

[45] Oct. 21, 1975

[54] RECEIVER FOR A STILL PICTURE BROADCASTING SIGNAL

[75] Inventors: Teruhiro Takezawa, Komae; Michio Masuda, Tokyo; Hiroaki Nabeyama; Katsuo Mohri, both of Yokohama; Masaaki Fukuda, Kodaira; Tatsuo Kayano, Hachioji; Takashi Uehara, Inagi; Eiichi Sawabe, Machida; Takehiko Yoshino, Yokohama; Hisakichi Yamane, Tokyo; Akio Yanagimachi, Kawasaki, all of Japan

[73] Assignees: Hitachi Limited; Hitachi Electronics, Ltd.; Nippon Hoso Kyokai, all of Tokyo, Japan

[22] Filed: Aug. 30, 1973

[21] Appl. No.: 393,163

[44] Published under the Trial Voluntary Protest Program on January 28, 1975 as document no. B 393,163.

[30] Foreign Application Priority Data

Sept. 4, 1972 Japan .............................. 47-87958

[52] U.S. Cl. ...................... 178/5.8 R; 178/DIG. 23

[51] Int. Cl.² ........................................ H04N 5/44

[58] Field of Search ........... 178/5.6, 5.8 R, DIG. 23

[56] References Cited

UNITED STATES PATENTS 3,493,674 2/1970 Houghton ........................... 178/5.6

*Primary Examiner*—Robert L. Richardson

*Attorney, Agent, or Firm*—Stevens, Davis, Miller & Mosher

[57] ABSTRACT

A receiver for receiving a composite signal including a first information signal, such as for instance, a number of video signals representing a number of still pictures, second information signal, such as for instance, pulse code modulated time division multiplex mutli-channel audio signals, control signal including information for processing above mentioned two signals in the receiver, and necessary synchronizing signals required for the reproduction of the above mentioned three signals being transmitted sequentially in a predetermined sequence, wherein during transmission period of said second information signal the signals to be reproduced in the same period are inserted in the composite signal as real signals and signals to be reproduced in the period when said second information signal is not transmitted are inserted in the composite signal as memory signals, and for continuously reproducing said second information signal which has been selected. The receiver comprises a means for selecting said control signal, a means for producing a signal for identifying real or memory of said second information signal by using the above mentioned selected control signal and for designating the same, a means for gating the real signal and the memory signal, a memory means for memorizing the memory signal, a means for supplying output signal of the designating means to said gate means, a means for storing the memory signal gated out by the gate means in the memory means and for reproducing the real signal immediately, and a means for reproducing the stored memory signal after delaying the same so as to form a continuous reproduced signal succeeding to the directly reproduced real signal.

5 Claims, 50 Drawing Figures

FIG_11

(a)

| $n$ | $2^0$ | $2^1$ | $2^2$ | $2^3$ | $2^4$ | $2^5$ | $2^6$ | $2^7$ |
|---|---|---|---|---|---|---|---|---|
| 0 | 0 | 0 | 0 | 0 | 0 | 0 | 0 | 0 |
| 1 | 1 | 0 | 0 | 0 | 0 | 0 | 0 | 0 |
| 2 | 0 | 1 | 0 | 0 | 0 | 0 | 0 | 0 |
| 3 | 1 | 1 | 0 | 0 | 0 | 0 | 0 | 0 |
| 4 | 0 | 0 | 1 | 0 | 0 | 0 | 0 | 0 |
| 5 | 1 | 0 | 1 | 0 | 0 | 0 | 0 | 0 |
| ⋮ | | | | | ⋮ | | | |
| 95 | 1 | 1 | 1 | 1 | 1 | 0 | 1 | 0 |

(b)

| $k$ | Odd/Even | $2^0$ | $2^1$ | $2^2$ | $2^3$ | $2^4$ | $2^5$ | $2^6$ |
|---|---|---|---|---|---|---|---|---|
| 0 | 0 | 0 | 0 | 0 | 0 | 0 | 0 | 0 |
| | 1 | 0 | 0 | 0 | 0 | 0 | 0 | 0 |
| 1 | 0 | 1 | 0 | 0 | 0 | 0 | 0 | 0 |
| | 1 | 1 | 0 | 0 | 0 | 0 | 0 | 0 |
| 2 | 0 | 0 | 1 | 0 | 0 | 0 | 0 | 0 |
| | 1 | 0 | 1 | 0 | 0 | 0 | 0 | 0 |
| | | | | | | | | |
| 47 | 0 | 1 | 1 | 1 | 1 | 0 | 1 | 0 |
| | 1 | 1 | 1 | 1 | 1 | 0 | 1 | 0 |

$k = \frac{n}{2}$ ($n$ = Even)

$k = \frac{n-1}{2}$ ($n$ = Odd)

RECEIVER FOR A STILL PICTURE BROADCASTING SIGNAL

BACKGROUND OF THE INVENTION

The present invention relates to a receiver for receiving a composite signal including a first information signal, for instance, a plurality of video signals representing a number of still pictures, second information signal, for instance, pulse code modulated time division multiplex multi-channel audio signals, and control signals including information for processing above two signals in the receiver, wherein the above signals are transmitted on one transmission path and in a predetermined sequence having a predetermined time interval, and for continuously reproducing the second information signal. In this composite signal, during the period of transmission of the first information signal, the second information signal to be reproduced in this period has been previously inserted in the second information signal transmission period as a memory signal, and the second information signal to be reproduced in the second information transmission period is transmitted as a real signal.

The receiver according to the present invention is particularly suitable for receiving a still picture broadcasting signal.

In one example of a still picture broadcasting signal, video signals representing a number of still pictures and a plurality of audio signals and also signal for designating combination of such signals are transmitted in time division multiplex using one frequency band corresponding to one channel of an ordinary television signal. An audience at the receiver end may select a pair of video and audio signals having correspondence with each other among of a plurality of the transmitted signals.

By arranging contents of the number of still picture informations to be independent from each other and by arranging audio signals to correspond to the respective video information, a number of such informations may be transmitted by one transmission path so that various requirements of audiences can be met.

Furthermore, by arranging all or a part of the number of transmitted still pictures and the corresponding audio signals to be a series having close corelation with each other and by previously determining the combinations of the video and audio signals and arranging sequence of the reproduction according to the response of the audience, it is possible to provide a programmed lesson.

In one system of such still picture broadcasting signal, a video signal of 1/30 second and an audio signal of 1/15 second are transmitted alternately in different time. In addition thereto, control signal for deciding the combination of video and audio signals and its sequence of reproduction is transmitted once in one second and during the period of 1/30 second. The video signal is transmitted by dividing it into horizontal scanning lines each having horizontal period of $1/f_H$ ($\approx$ 63.5 $\mu$s) as same as the standard television broadcasting signal of NTSC system used in Japan or in the USA and one complete picture signal is transmitted within 1/30 second. The audio signal is transmitted in different period $1/f_A$ different from that of the video signal and in pulse code modulated multiplex signal. The audio signal to be reproduced in the video signal transmission period is transmitted in superposition to the audio signal transmission period. The control signal is transmitted as coded signal on modulated pulse series as same as the audio signal. Accordingly, the synchronizing signals required for the reproduction of these signals are inserted in the above composite signal in different period, i.e., different in the video and audio transmission period.

In order to reproduce an audio signal from such still picture broadcasting signal, at first it is necessary to reproduce the synchronizing signal. Further, it is required to derive only a desired signal from a number of multiplex channels and also it is required to temporarily store the audio signal during a period in which such audio signal is not transmitted.

SUMMARY OF THE INVENTION

The present invention has for its object to provide a novel and practical receiver which can be suitably used for receiving such a still picture broadcasting signal.

Other object of the present invention is to provide a receiver for receiving signal intermittently transmitted and the information during the non transmission period is transmitted as multiplex signal in the transmission period and for continuously reproducing the transmitted signal.

Still further object of the invention is to provide a receiver for selectively reproducing a signal in one channel out of pulse code modulated and multiplexed signal in a number of channels.

According to one aspect of the present invention, the receiver for receiving a composite signal comprising first information signal, second information signal, and a control signal including information for processing above two information signals at receiving end, of which three signals being transmitted alternately and in predetermined sequence, wherein at the receiving end in order that the second information signal can be reproduced continuously even during a period in which the second information signal is not transmitted, the second information signal content to be reproduced in said period has been previously multiplexed as a memory signal and transmitted in the transmission period of said second information signal and to reproduce said second information signal, comprises;

a means for selecting said control signal, a means for discriminating said second information signal whether it is a memory signal or a real signal to be reproduced instantaneously by using the selected control signal selected by said control signal selecting means, a gate means for selectively switching said second information signal into memory signal and real signal which is to be reproduced instantaneously by using the output signal of the discriminating means, a means for memorizing the memory signal selected by said gate means, and a means for reproducing said real signal to be reproduced instantaneously when received, and for reproducing the memory signal stored in the memory means after delaying the same signal so as to continue said instantaneously reproduced signal.

According to the present invention it is possible to reproduce a continuous signal from an intermittently transmitted signal.

BRIEF DESCRIPTION OF THE DRAWINGS

FIG. 11 is a chart for explaining the conversion of channel number from 8 bit binary digits to 7 bit binary digits and also a relation between channel number and its binary digits in discriminating the odd-even number.

DESCRIPTION OF THE PREFERRED EMBODIMENT

As a most suitable composite signal to be received by the receiver according to the present invention, a still picture broadcasting signal will be explained for its one example by referring to FIGS. 1 and 2.

Figure 1:
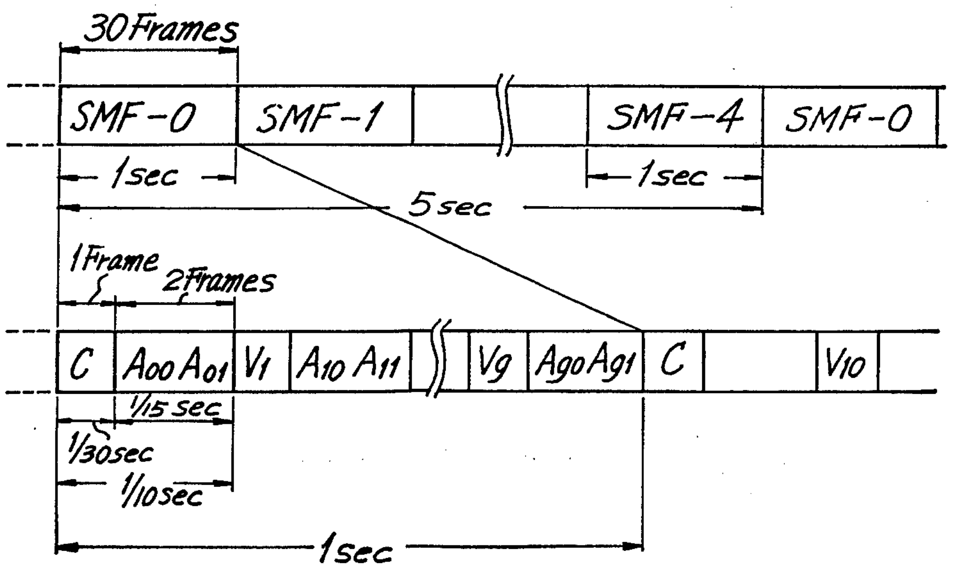
FIGS. 1 and 2 are diagrams for explaining general scheme of one embodiment of the still picture broadcasting signal.

The still picture broadcasting signal as shown in FIG. 1 has 5 seconds repetition period and within the 5 seconds repetition period five submaster frames SMF-O, SMF–1, . . . SMF–4 each having 1 second period are transmitted sequentially. After a lapse of 5 seconds, an identical submaster frame with the prior period is repeatedly transmitted. One submaster frame SMF consists of 30 television frames each having the television frame period of 1/30 second. One television frame out of said 30 television frames in one submaster frame is used as a control frame C, which contains control signals to be used at the receiving end for correctly receiving various programs each consists of a combination of a pair of video and audio signals transmitted from the transmitter end and for selecting a particular pair of video and audio signals representing a particular program out of a number of such pairs. 9 frames V or more precisely $V_1$–$V_9$ are used as video frames and other 20 frames A or more precisely $A_{00}$, $A_{01}$, . . . $A_{90}$, $A_{91}$ are used as audio frames. In one submaster frame SMF, the control frame C is located at the top of the frame series.

Figure 2:
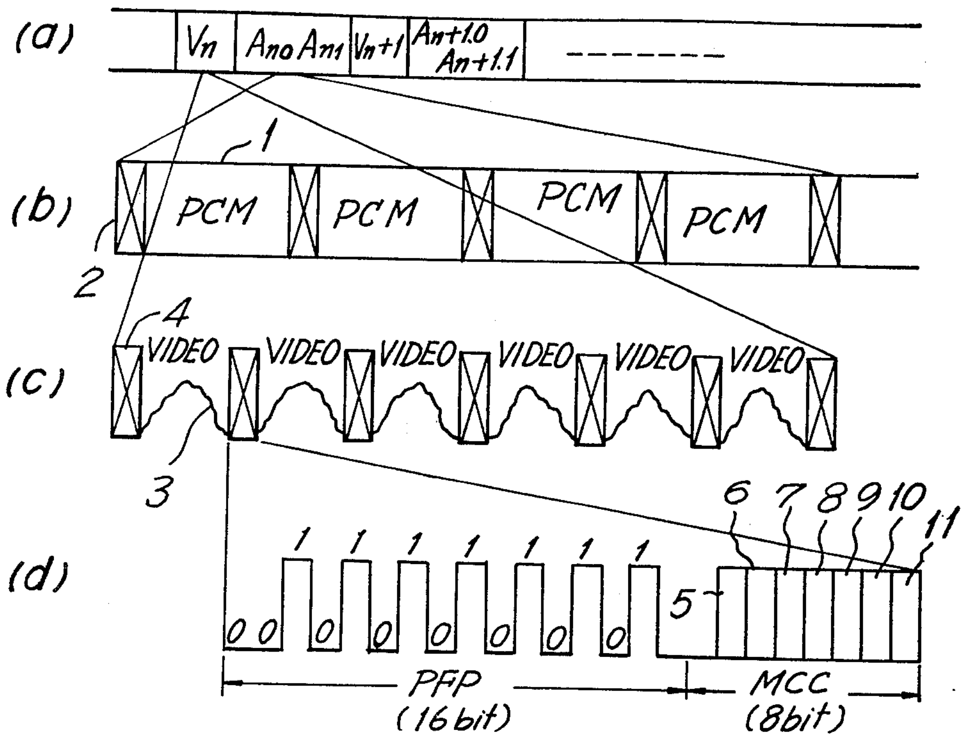

FIGS. 2_a_–2_d_ show more details of the still picture broadcasting signal, in which FIG. 2_a_ corresponds to FIG. 1. FIG. 2_b_ is a diagram showing a part of audio frame A in an enlarged time scale, which contains pulse code modulated audio multiplex signal 1 and synchronizing signal 2. Sampling period of the audio multiplex signal 1, namely the insertion period of the synchronizing signal 2 is $1/f_A$ second, wherein $f_A \approx 10.5$ KHz. This period is termed as PCM audio frame period hereinafter. FIG. 2_c_ is a signal waveform diagram of the part of the video frame V in an enlarged time scale, which video signal comprises video signal 3 and synchronizing signal 4 same as an NTSC system. The synchronizing signal 4 is inserted at each horizontal scanning period of $1/f_H$ second, wherein $f_H = 15.734$ KHz. Accordingly, there exists the following relation;

$$f_A/f_H = 2/3$$

Further the locations of insertion of both the synchronizing signals 2 and 4, in other words the phases of the two synchronizing signals 2 and 4 coincide each other at the greatest common measure frequency of about 5 KHz of the two frequencies $f_H$ and $f_A$. The both synchronizing signals consist of PCM frame pattern signal hereinafter referred to as PFP signal and mode control code signal hereinafter referred to as MCC signal. The PFP signal consists of 16 bit pulses synchronized with the modulated pulse series of the PCM audio multiplex signal and having a fixed pattern of 0101 . . . By using the fixed pulse pattern, the bit signal $f_b$ of 6.5454 MHz for taking the timing of the pulse code modulated (PCM) signal can be reproduced. The MCC signal consists of 8 bit pulses. Among the 8 bit pulses, seven kinds of the synchronizing signals, i.e., horizontal synchronizing signal 5 having repetition frequency of 15.75 KHz, PCM audio frame synchronizing signal 6 having repetition frequency of about 10.5 KHz, frame synchronizing signal having repetition frequency of 30 Hz, synchronizing signal 8 for showing location of the control frame C, synchronizing signals 9, 10 for showing location of the first and second audio frames, and synchronizing signal 11 for showing location of the video frame are inserted. In these synchronizing signals 5–11, a pulse having value 1 represents existence of corresponding synchronizing signal and a pulse value 0 represents absence of the synchronizing signal.

Figure 3:
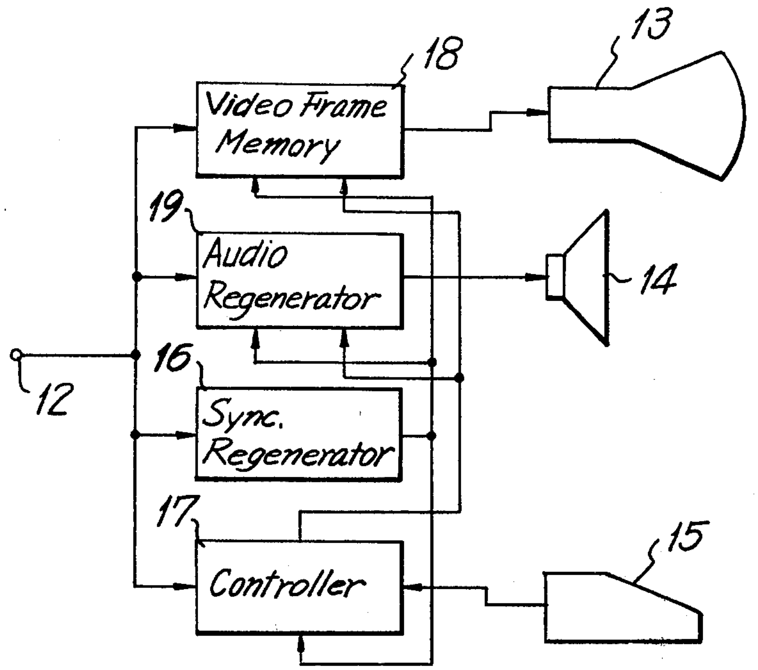
FIG. 3 is a block diagram for showing outline of a receiver for receiving the still picture broadcasting signal.

The still picture broadcasting signal as shown in FIGS. 1 and 2 may be received by a receiver as shown in FIG. 3.

FIG. 3 is a block diagram for showing outline of a receiver for the still picture broadcasting signal. In the figure, 12 is an input terminal to which the above mentioned still picture broadcasting signal is applied. 13 is a kinescope which displays the transmitted still picture. 14 is a speaker for reproducing the transmitted audio signal. 15 is an instruction keyboard to be used for the selection of a desired pair of video and audio signals by the audience. The still picture broadcasting signal applied to the input terminal 12 is at first processed to derive out only for the synchronizing signal portion in the synchronizing signal regenerator 16 and the synchronizing signal is reproduced therein and transmitted to further portions of the receiver as the required information for the reproduction of the still picture. Controller 17 takes matching with the control signal in the still picture broadcasting signal based on an instruction delivered from the instruction keyboard 15 and detects timing of a desired pair of video and audio signal and supplies trigger pulses to video frame memory 18 and to audio signal regenerator 19. The video frame memory 18 picks up only the desired video signal based on the trigger pulse and memories one frame video signal in the memory and the still picture is reproduced and displayed in the kinescope 13 by supplying the memoried signal repeatedly, namely, supplying the memoried signal as a continuous signal. The audio signal regenerator 19 picks up the desired audio signal based on the above mentioned trigger pulses and the audio signal is reproduced by supplying it to the speaker 14.

More detail for the reproduction of the audio signal will be explained hereinafter.

As explained above the audio signal is contained in the audio frame as PCM audio multiplex signal. As a practical embodiment, a case in which 480 seconds audio information is multiplexed within 5 seconds repetition period of the still picture broadcasting signal. In this case, the number of multiplexity, i.e., number of channels becomes 480 sec ÷ 5 sec = 96. Namely, audio signals of 96 channels are to be transmitted in the two audio frames of $A_0$, $A_1$. However, when considering a fact that the reproduced audio signal should be continuous, the audio signal to be reproduced during the period of the video frames should further be inserted and transmitted in said two audio frames $A_0$, $A_1$. Such insertion or superposition is termed as audio interpolation method.

Figure 4:
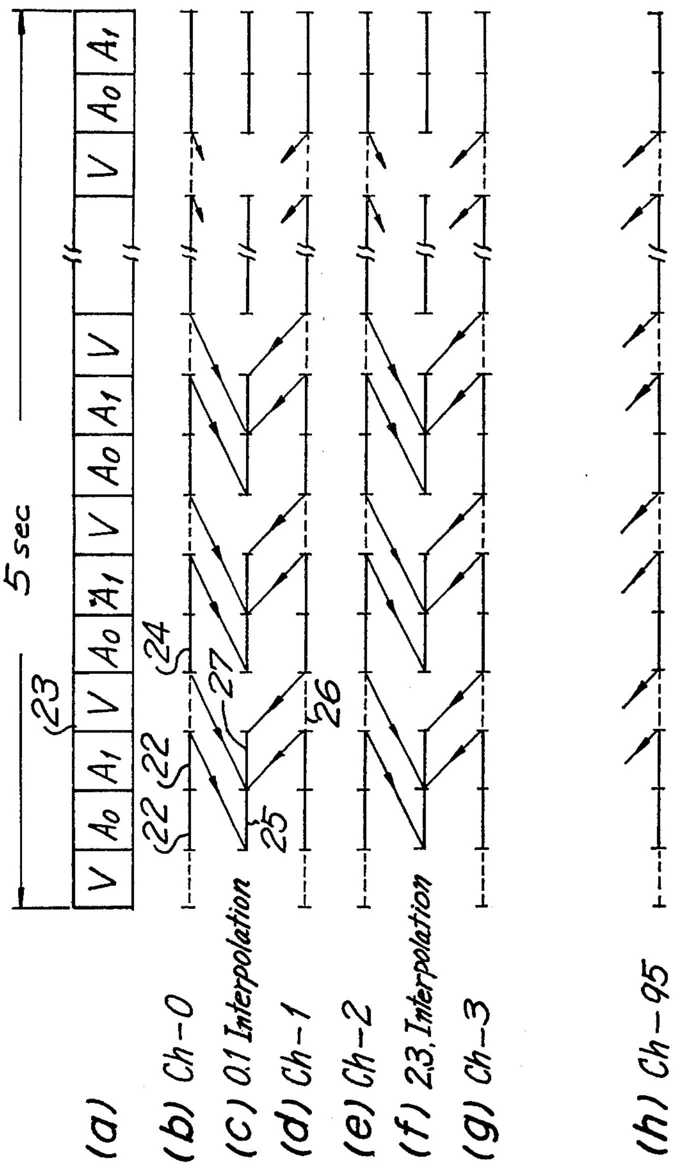
FIG. 4 is a chart for showing one example of audio signal insertion scheme in the still picture broadcasting signal as shown in FIGS. 1 and 2.

The principle of audio interpolation will be explained by referring to FIGS. 4*a*–4*h*. FIG. 4*a* is a diagram for showing one general sequence of the video frame periods and the audio frame periods in a still picture broadcasting signal. FIG. 4*b* shows audio signal for the first channel, i.e., channel-0. In this figure, 22, 22 represent the audio signal in the channel-0 corresponding to the two audio periods of $A_0$, $A_1$. At the reproduction, the signals 22, 22 transmitted in these periods $A_0$, $A_1$ are directly reproduced in the same period so that these signals are termed as real signal. An audio signal to be reproduced in the video frame period 23 can not be inserted and transmitted in said video frame V of the period 23. Accordingly, the corresponding signal should be inserted in different channel. For instance, as shown in FIG. 4c, the audio signal 24 in channel-0 is interpolated at a location 25 of the interpolation channels-0, 1 in $A_0$ period and is transmitted simultaneously with the above mentioned real signal by superposition. This signal should be memorized by some means in the receiver and be delayed by 2/30 second and to be reproduced as a continuous signal with the real signal. Accordingly, this audio signal 25 is termed as a memory signal. In a same manner, memory signal 26 in the channel-1 shown in FIG. 4*d* is interpolated in $A_1$ period of interpolation channels-0, 1 as shown by 27 in FIG. 4*c*. Also in the same manner, the audio signal of channels-2, 3 are transmitted in the audio frame $A_0$, $A_1$ period as shown in FIGS. 4*e*–4*g*. In the same manner for the interpolation of audio signals up to channel-95 as shown in FIG. 4*h*, it is required 47 interpolation channels for the transmission of 96 channels. Accordingly, for transmitting the altogether 480 seconds audio signal in 5 seconds period, multiplexity of the audio signals is (96+48) = 144 channels.

Figure 5:
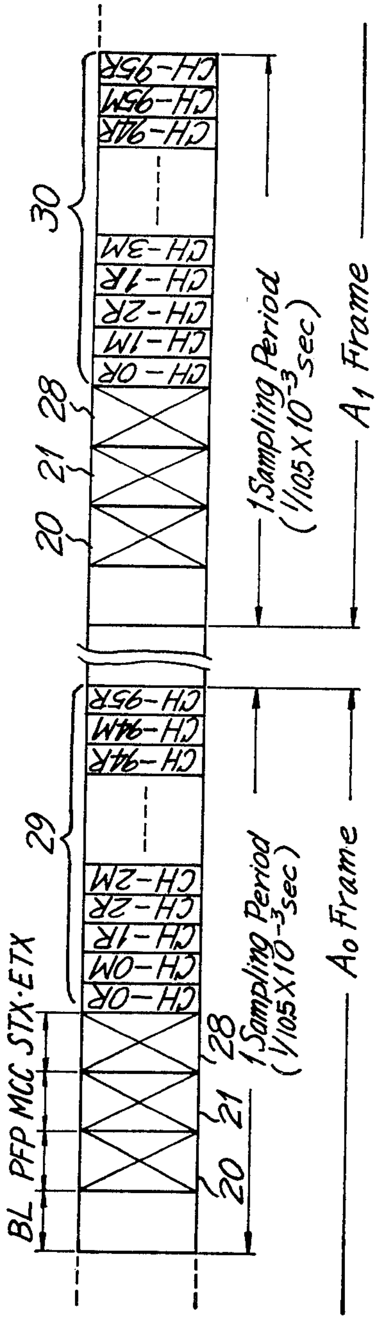
FIG. 5 is a diagram for showing one example of signal transmission scheme in which the pulse code modulated audio signal is multiplexed and inserted in the signal scheme as shown in FIGS. 1 and 2.

FIG. 5 shows the manner of interpolation of the pulse code modulated multiplex signal into the two frames $A_0$ and $A_1$. In one sampling period in the $A_0$ frame which is also termed as PCM frame period of $1/(10.5 \times 10^3)$ second, as shown by 29 in FIG. 5, real signal of channel-0, memory signal of channel-0, real signal of channel-1, real signal of channel-2, . . . are inserted. By simply expressing the real signal by R and the memory signal by M, said period 29 contains R-M-R-R-M-R . . . up to real signal of channel-95. On the other hand, in the audio signal 30 in $A_1$ frame it is arranged as real signal of channel-0, memory signal of channel-1, real signal of channel-1 and so on and such as R-M-R-R-M-R . . . and up to real signal of channel-95. At the beginning of each PCM frame there is a blanking period BL, and thereafter PFP signal 20 and MCC signal 21 are inserted. 28 is pulse code modulated signal for instructing the starting of reproduction of the audio signal or termination thereof which are termed as STX signal and ETX signal.

In order to transmit the still picture broadcasting signal including pulse code modulated signal of the 144 channel signal within 6 MHz band just same as a standard television broadcasting system, the PCM audio signal is modified into quarternary PCM signal.

Figure 6:
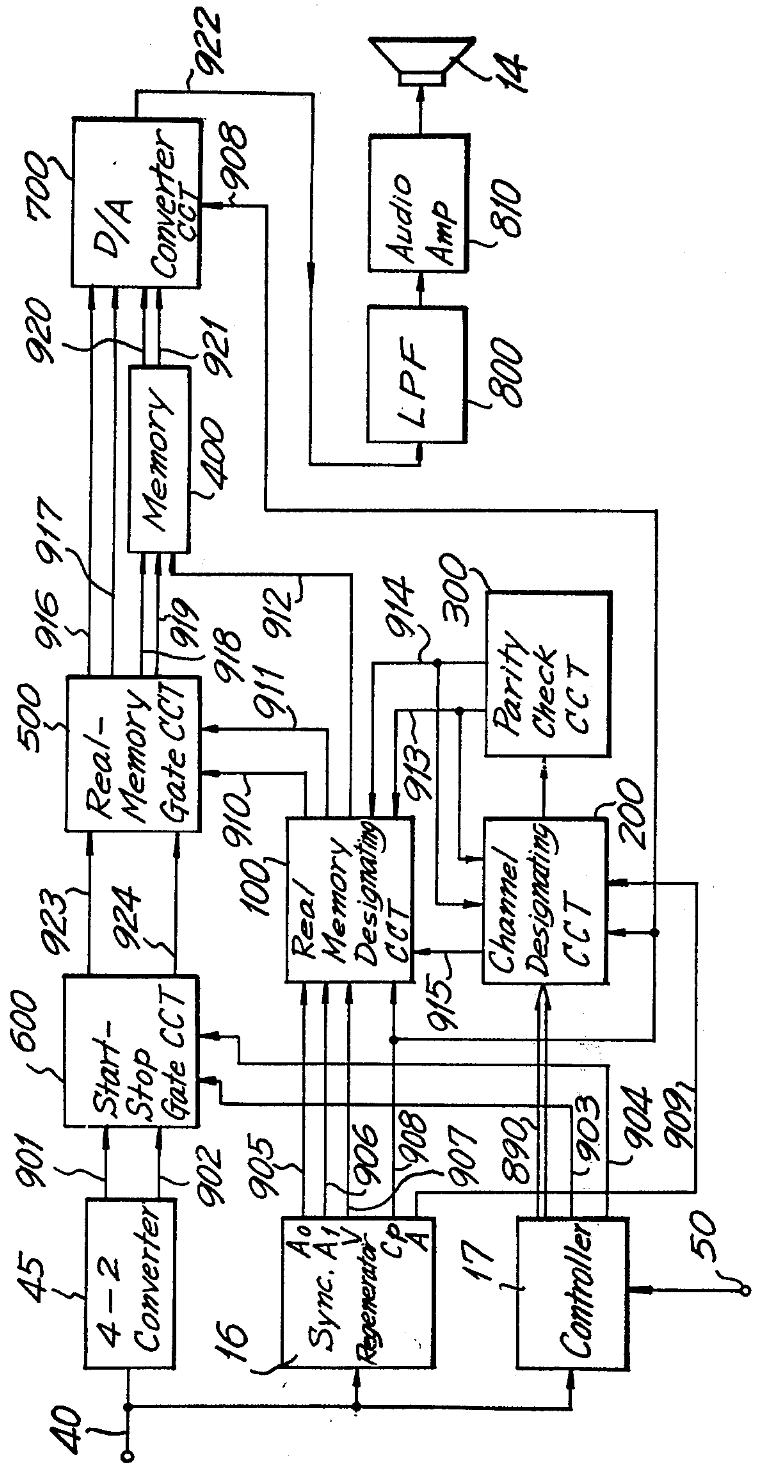
FIG. 6 is a block diagram of a receiver of the present invention especially showing for the portion of audio reproduction.

FIG. 6 is a block diagram for showing a practical embodiment of the audio signal regenerator 19 shown in FIG. 3. In FIG. 6, 40 is an input terminal for the still picture broadcasting signal, and 45 is a quarternary to binary converter, which converts a quarternary PCM signal into two series of binary PCM signals. 600 is a start-stop gate circuit, which controls start or stop of supply of the two series of binary PCM signals to the succeeding stages by start or stop instruction sent from the controller 17. 500 is a real-memory gate circuit. As explained above, the audio signal is divided into real signal and memory signal so that the gate circuit 500 switches the real signal to be supplied directly to D/A converter 700 so as to reproduce audio content and to switch the memory signal to be supplied to a memory 400 and to be stored therein. The audio signal reproduced at the D/A converter 700 is supplied via a low-pass filter 800 and an audio amplifier 810 to a speaker 14 to reproduce a desired voice. The circuit designated 100 is a real-memory designating circuit for producing signal to control the above mentioned real-memory gate circuit 500, and a block 300 is a parity check circuit for checking the designated channel number whether it is an odd number or an even number. By the operation of an audience on the instruction keyboard 15, control signals are selected at the controller 17 and are sent to other circuits. The channel designating circuit 200 indentifies designated channel number by the control signal. The parity check circuit 300 simultaneously makes odd-even check for the designated channel number. This is based on a fact that the memory signal corresponding to the audio information to be reproduced during the video frame period or control frame period, during which the audio signal is not transmitted, is inserted into different frames in the even number channel and in the odd number channel so that the insertion period is to be identified by the odd-even check. If the channel number to be reproduced is even, the real signal and succeeding memory signal are taken out in $A_0$ period, and only the real signal is taken out in $A_1$ period. If the channel number to be reproduced is odd, only the real signal is taken out in $A_0$ period, and memory signal and succeeding real signal are taken out in $A_1$ period. The real-memory designating circuit 100 is supplied with the output signal from the parity check circuit 300, various synchronizing signals from the synchronizing signal regenerator 16 and output signal from the channel designating circuit 200 and controls real-memory gate circuit 500, which selects the real signal and the memory signal and supplies the memory signal to the memory circuit 400 and the real signal to the D/A converter 700.

More detail of the main circuits will be explained hereinafter.

The quarternary-binary converter 45 is a circuit for converting a quarternary PCM signal into two series of binary signals. For instance, this circuit 45 makes conversion from 8 bit one word signal into two series of 4 bit binary digit signal, i.e., into even digit 4 bit binary series of $2^0$, $2^2$, $2^4$, $2^6$, and odd digit 4 bit binary series of $2^1$, $2^3$, $2^5$, $2^7$. The converter 45 sends the even digits output into signal line 901 and odd digits output into signal line 902.

Figure 7:
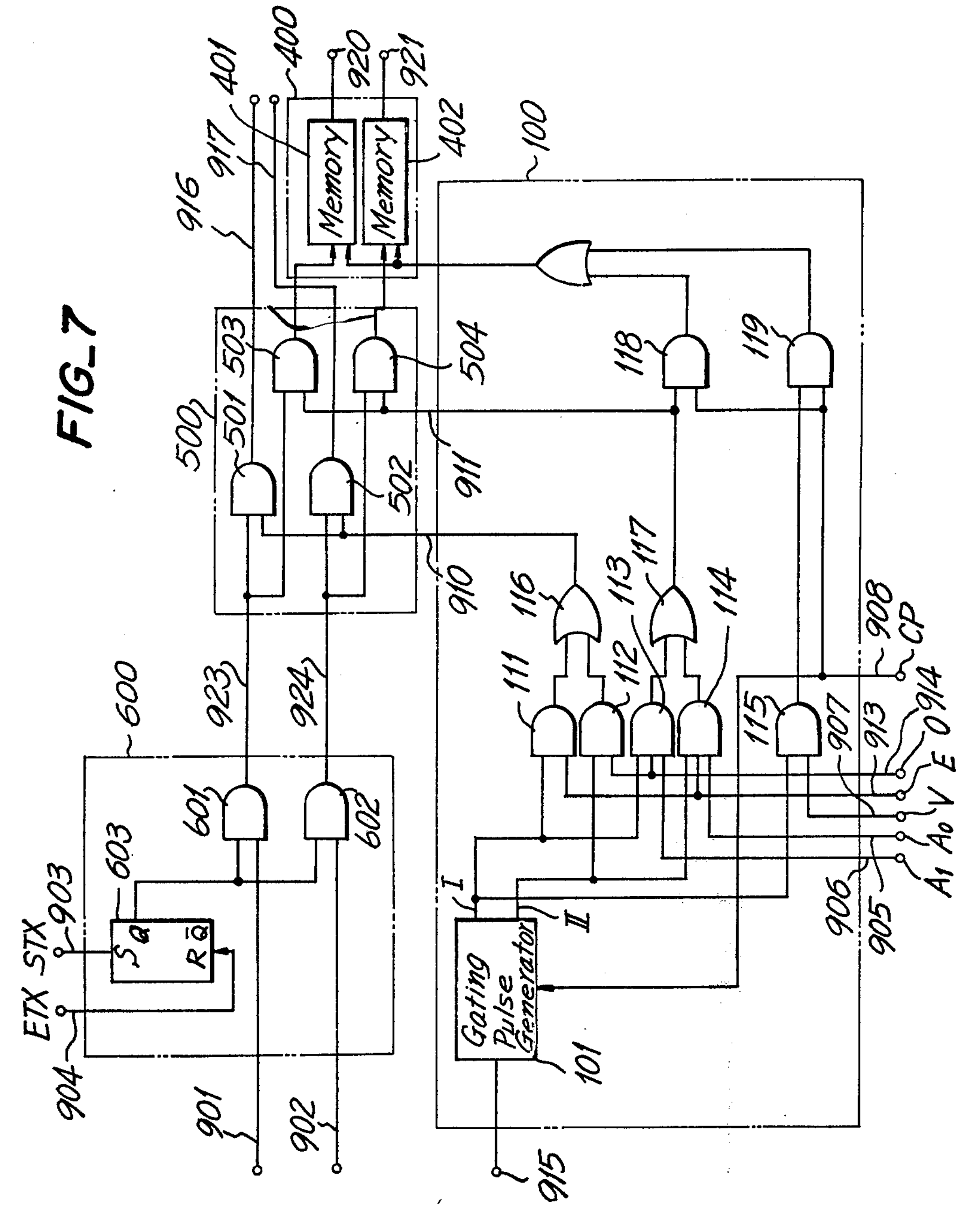
FIG. 7 is a circuit diagram of one example of real-memory gate circuit, and real-memory designation circuit shown in FIG. 6.
Figure 8:
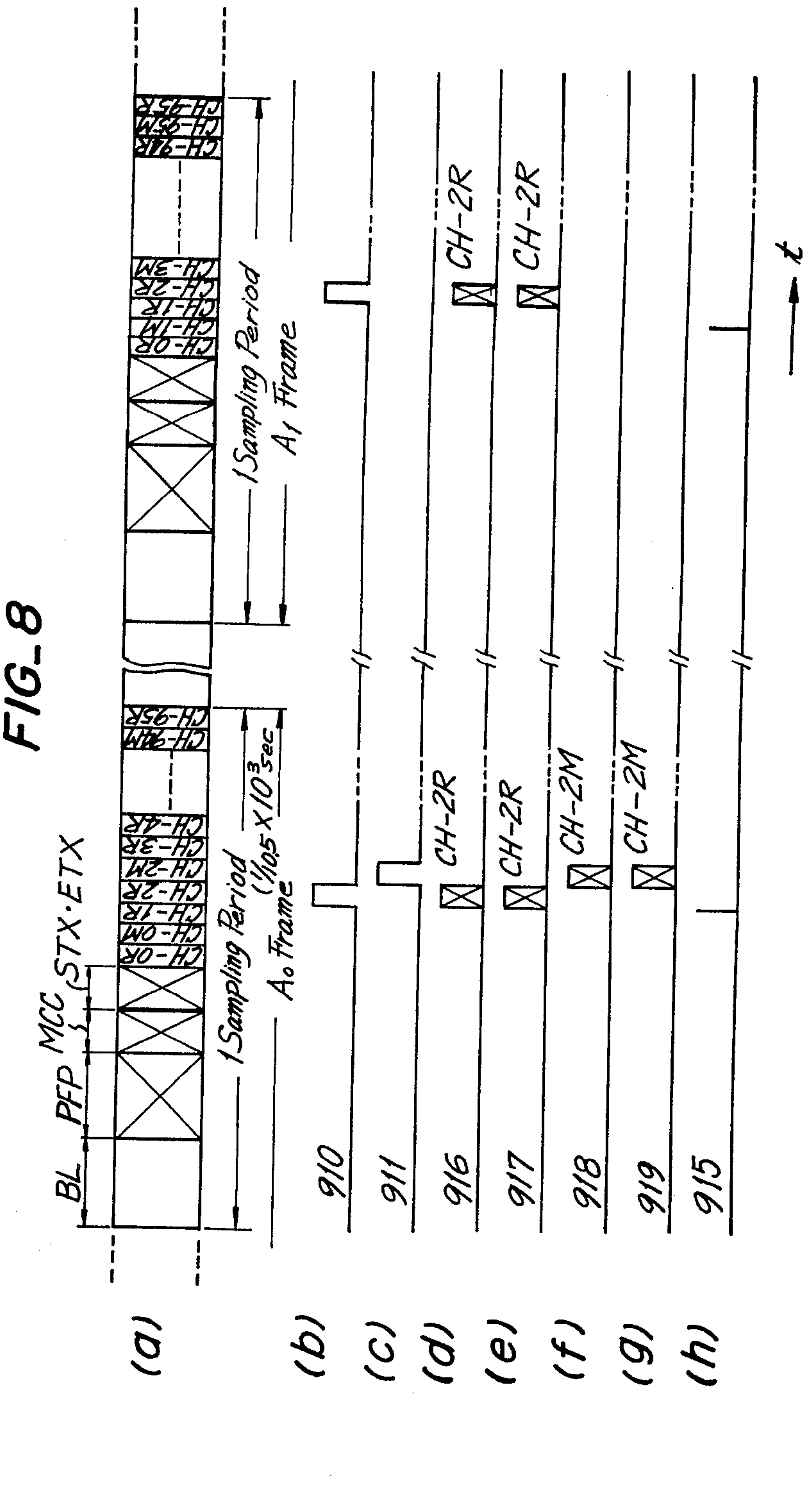
FIG. 8 is a timing chart for explaining operation of the real-memory gate circuit and the real-memory designation circuit.

FIG. 7 shows circuit diagram of a practical embodiment of the real-memory gate circuit 500, real-memory designating circuit 100, and memoyr 400. FIG. 8 is a timing chart for showing the relation between the input and output signals of the real-memory gate circuit 500 and the real-memory designating circuit 100. The numerals indicated in FIGS. 8b-8h correspond to the signals on the signal lines indicated by the same reference numbers.

Referring to FIG. 7, quarternary-binary converter 45 supplies two series of the signal to the start-stop gate circuit 600 through signal lines 901 and 902. The start-stop gate circuit 600 comprises a flip-flop circuit 603 of the set-reset type and two AND gates 601 and 602. Using the STX, ETX signal 28 shown in FIG. 5, the STX signal on the channel to be reproduced is detected by the controller 17 and the output signal is applied to the input terminal 903 of the flip-flop circuit 603. By this signal, Q outuput of the flip-flop 603 becomes level 1 and the input signals to the two AND gates 601 and 602 through signal lines 901 and 902 are transferred to the output signal lines 923 and 924. When the controller 17 detects ETX signal showing termination of the audio signal, an ETX pulse is supplied from the controller 17 and is applied to input terminal 904 of the flip-flop circuit 603 so that the Q output becomes level 0 and the two outputs of the AND gates 601 and 602 are interrupted. The STX, ETX signal 28 is inserted preceding to the PCM audio signal 29 as shown in FIG. 5 and indicates channel number which is required for starting the audio reproduction or interruption of the same. This signal, if it is included in $A_0$ frame, represents start of the same, and if it is included in $A_1$ frame, represents termination of the same.

In the manner as explained in the foregoing, the gated out signal during the transmission period of the audio signal to be reproduced, such as for instance shown in FIG. 8a, is supplied to the real-memory gate circuit 500. On the other hand, a channel designating pulse as shown in FIG. 8h is applied to an input signal path 915 of the real-memory designating circuit 100 from the channel designating circuit 200. This pulse is produced in the same timing not only in the audio frame but also in the video frame, and is utilized at the reproduction of the memory signal which will be described hereinafter. Referring this figure, for example, a case for designating channel-2 will be explained. The channel designating pulse is applied as a trigger pulse to a gating pulse generator 101, two gating pulses corresponding to the pulse width of one audio channel are produced by using bit period clock pulses supplied from an input signal path 908. A gating pulse for one channel with the leading edge in coincidence with the trigger pulse as shown in FIG. 8h is produced at an output terminal I, and at an output terminal II, a gating pulse delayed by one channel period from the gating pulse on the output terminal I is produced.

The gating pulse appearing at the output terminal is applied to AND gates 111 and 113. To the other input of the AND gate 111, an output signal from the parity check circuit 300 for indicating even number is applied through an input signal path 913. In the present embodiment the designated channel is channel-2 so that the channel number is even number and 1 signal is applied to the signal path 913. Accordingly, the gating pulse passes the AND gate 111. This gating pulse then passes AND gate 116 and appears on an output signal path 910. This gating pulse constitutes a pulse for gating real signal on channel-2, and appears at a same location in $A_0$ and $A_1$ frames at each sampling period. The gating pulse obtained from the output terminal I of the gating pulse generator 101 and applied to the AND gate 113 does not appear on its output, because one of the other inputs of the AND gate 113 connected to an output for indicating odd number of the parity check circuit 300 via an input signal line 914 is supplied 0 output signal therefrom.

The one channel delayed gating pulse appearing at output terminal II of the gating pulse generator 101 is applied to AND gates 112 and 114. To the other input terminal of the AND gate 112 a 0 signal is supplied since the designated channel-2 in this case is not an odd number so that the gating pulse does not appear to the output. The AND gate 114 passes the gating pulse applied from the output terminal II only when the channel number is even and also 1 signal is applied to further input terminal via signal path 905. Namely, the AND gate 114 passes the gating pulse during $A_0$ frame. On the output signal path 911, the one channel delayed pulse as shown in FIG. 8c delayed from the pulse shown in FIG. 8bappears only during the $A_0$ frame period.

The above explained two kinds of gating pulses are supplied to AND gates 501, 502 and 503, 504 and the designated channel-2 signal is gated out from the still picture broadcasting signal. By the AND gates 501, 502, the real signals as shown in FIGS. 8d and 8e are gated out and the real signals are directly supplied to the D/A converter 700 via signal lines 916 and 917. The memory signals as shown in FIGS. 8f and 8g are gated out by AND gates 503 and 504 and are supplied to memory circuits 401 and 402. The memory circuits 401 and 402 effect storing and reading out of the memory signals by using shift registers and by using clock pulses supplied from terminal 908. AND gate 118 is a gate circuit for supplying the clock pulses to the memory circuit 401 and 402 at the storing period thereof and delivers the output signal at the same time with opening of the AND gates 503 and 504. AND gate 119 is a gate circuit for supplying the clock pulses at the reading out period thereof and delivers the output signal when there is an output signal from AND gate 115. To the input terminals of the AND gate 115, an output pulse from the output terminal I of the gating pulse generator 101 and a signal for indicating video frame supplied from the synchronizing signal regenerator 16 are applied. As explained in the foregoing, the channel designating pulses are applied to the gating pulse generator 101 even in the video frame period so that the gating pulses are always supplied from the output terminal I to the AND gate 115. Accordingly, the memory signals stored in the memories 401 and 402 during the video frame period can be read out by using the same timing with the real signal.

Figure 9:
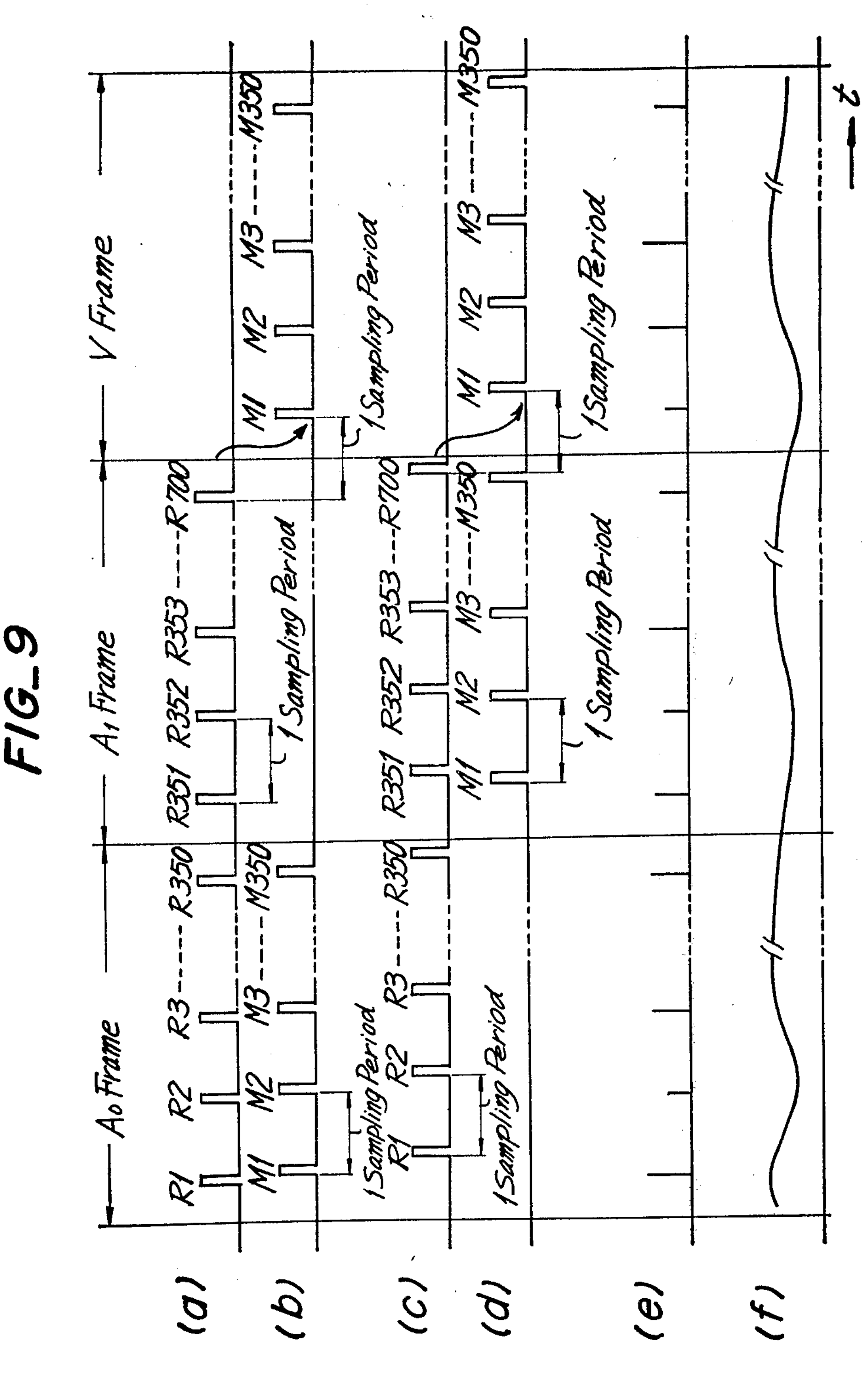
FIG. 9 is a diagram for showing one example of audio signal timing from which a designated channel has been gated out and an example of reproduced audio signal.

Reproduced timing of thus gated out audio signals is shown in FIG. 9. FIGS. 9*a* and 9*b* represent even channel and FIGS. 9*c* and 9*d* represent odd channel. In case of even channel, the real signal is gated out in the sampling period by using the PCM signal $R_1$–$R_{700}$ of the designated channel both in the $A_0$ and $A_1$ frames and reproduced immediately. As the memory signal is inserted in $A_0$ frame so that only from the $A_0$ frame PCM signal $M_1$–$M_{350}$ are derived and memorized. After termination of $A_1$ frame and transition into video frame V, namely, after a delay of two frames (1/15 second), the memory signal is read out and reproduced. In odd channel, the real signal may be reproduced immediately just as same as the even channel. However, as the memory signal is inserted in $A_1$ frame, it is gated out in the $A_1$ frame and memorized. The memorized memory signal is delayed by one frame (1/30 second) and read out in video frame V by using the same timing with the gating pulse and reproduced.

FIG. 9*e* shows a waveform of pulse amplitude modulated signal after D/A conversion of the PCM signal in the D/A converter 700. FIG. 9*f* is a waveform of audio signal after passing the above signal through a low-pass filter.

Figure 10:
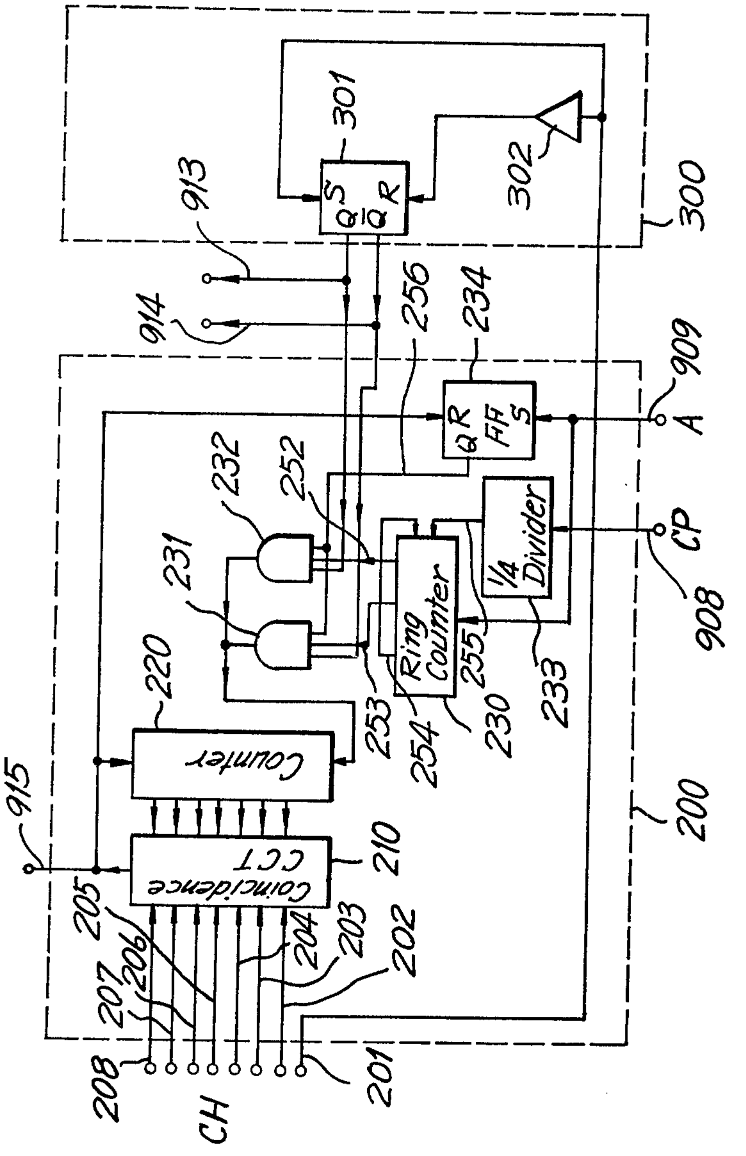
FIG. 10 is a circuit diagram of one example of a channel designating circuit and a parity check circuit shown in FIG. 6.
Figure 12:
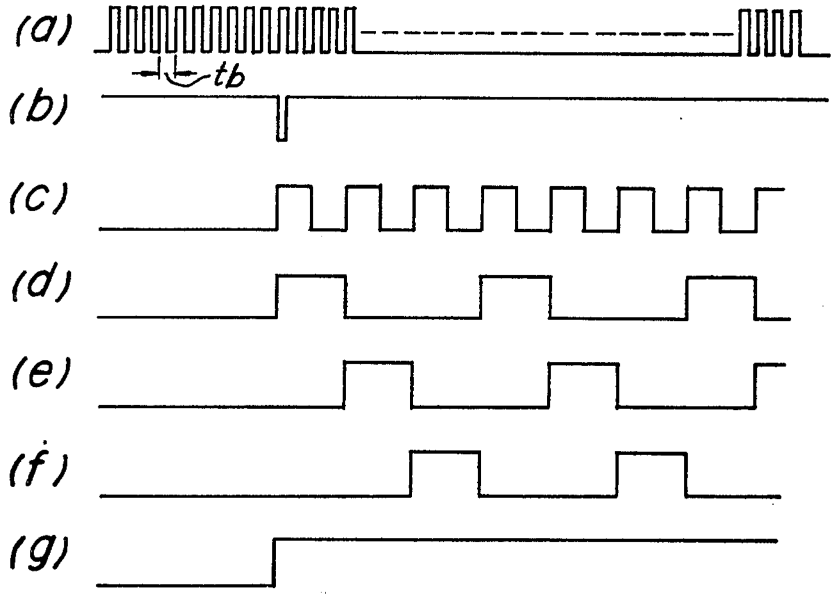
FIGS. 12 and 13 are timing chart for explaining the operation of the circuit shown in FIG. 10.
Figure 13:
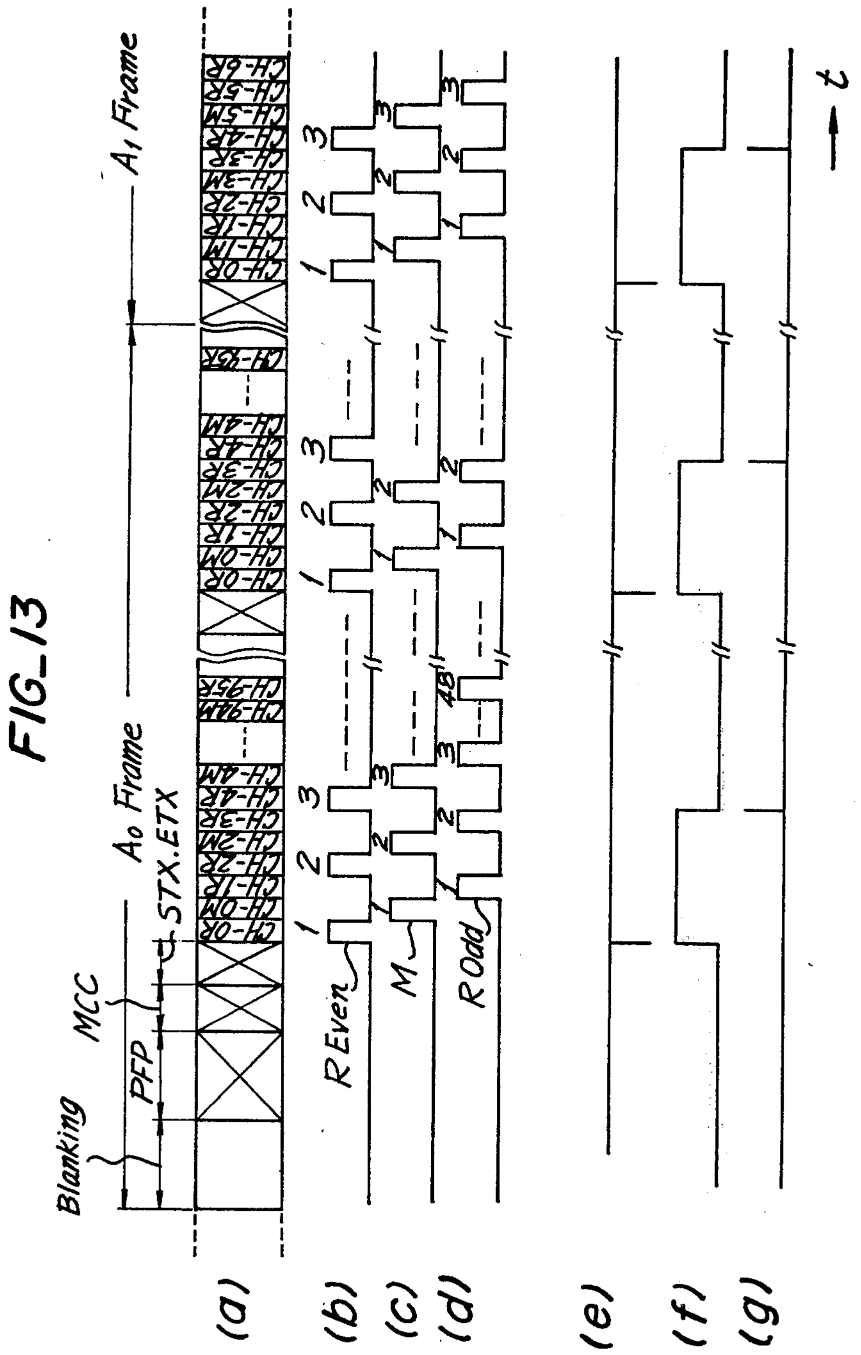

Operation of the channel designating circuit 200 and the parity check circuit 300 will be explained. FIG. 10 is a practical circuit diagram for showing detail of these circuits. FIG. 11 shows charts of binary digits corresponding ordinary numbers for explaining conversion of channel number into binary digits. FIGS. 12 and 13 are timing charts for explaining operation of the circuit shown in FIG. 10. Reference numerals shown on FIGS. 12*a*–12*g* represent signals on signal path attached with corresponding reference numbers.

Now referring to FIG. 10, to the eight signal lines 201–208 of the channel designating circuit 200, signals as shown in FIG. 11*a*, which represents 8 bit binary digit for indicating channel number of an audio channel designated by the controller 17, are applied. In the chart shown in FIG. 11*a*, *n* represents the channel number. The corresponding binary signals for the channel number are applied to the input signal lines 201–208, i.e., 0 or 1 signals indicated in the chart for each digit is applied to each of the signal lines. In case if the channel number is 5, then the position or digit $2^0$ is given value 1 and $2^1$ value 0, $2^2$ value 1, $2^3$–$2^7$ value 0. In this case, the signal applied to the signal line 201, i.e., the signal on the least significant digit $2^0$ is applied to the parity check circuit 300 for effecting odd-even check of the channel number. The channel number is subtracted by one digit, i.e., the channel number *n* is made to $n/2$ in case of an even number and to $(n-1)/2$ in case of an odd number. By this means, 0–95 channel numbers are converted into groups of 0–47 of even channels and 0–47 of odd channels.

FIG. 11*b* shows signal value for each digit after subtracting by one digit. Each of the channel number *k* is identified by the one digit subtracted digit attached with an indication of odd or even number. In other words, the signals in $2^7$ positions of 8 bit binary signal is subtracted by one position so as to form $2^6$ position signals. By utilizing $2^0$ position signal of the 8 bit binary digits and the odd-even check is made depending upon 1 or 0 of each signal at $2^0$. This is based on a fact that the location of the memory signal in the frame $A_0$ or in the frame $A_1$ can be identified depending on odd-even number identification of the channel number.

In the parity check circuit 300, the signal on the least significant position of the input signal line 201 is applied to set input S of a flip-flop circuit 301 directly and to its reset input R via an inverter 302. The parity check circuit 300 sends on the Q output terminal 1 signal and on the Q output terminal 0 signal in case the channel number is even, based on a fact that in this case the signal applied on the signal line 201 is 0 and therefore the input S receives 0 signal and the input R receives 1 signal. When the channel number is odd, the output signals become inverse thereto. These output signals are applied to the real-memory designating circuit shown in FIG. 7 through signal lines 913 and 914 and at the same time are applied to AND gates 231 and 232 of the channel designating circuit 200.

The channel designating circuit 200 being applied the clock pulses having the bit period as shown in FIG. 12*a* through an input signal path 908 produces pulse series as shown in FIG. 12*c* by a 1/4 frequency divider 233. By applying the pulse series to a three stage ring counter 230, three signals shown in FIGS. 12*d*, 12*e* and 12*f* are produced from each of the stages. The relative position of the three signals with the still picture broadcasting signal is shown in FIG. 13 and in particularly in FIGS. 13*a*–13*d*. The PCM audio signal as shown in FIG. 13*a* has the real signal R and memory signal M as R-M-R-R-M-R . . . up to 144 words, in which the memory signals M consist the interpolation words for even channels in $A_0$ frame and for odd channels in $A_1$ frame. The pulse series shown in FIG. 12*d* or FIG. 13*b* show the position of the real signals in even channels, such as channel-0 real signal, channel-2 real signal . . . etc. In the same manner, the pulse series shown in FIG. 12*e* or FIG. 13*c* show the position of the memory signals, and that shown in FIG. 12*f* or FIG. 13*d* show the position of the real signals in the odd channels. By this scheme, by identifying odd or even of the channel number and the order in the odd or even group, a particular channel can be designated. For instance, in an even channel, by counting the pulses in the series shown in FIG. 12*d* or FIG. 13*b* and identifies the designated channel, and in $A_0$ frame the R and the M of the succeeding word are gated out, and in $A_1$ frame only the R word is gated out. In an odd channel, by counting pulses shown in FIG. 12*e* or FIG. 13*c* and identifies the designated channel, and in $A_0$ frame only one word delayed R is gated out and in $A_1$ frame M and also R in the next word are gated out.

The operation is effected in the circuit shown in FIG. 10 in the following manner. The pulse signals shown in FIG. 13*b* are derived from an output terminal 252 of the ring counter 230 and are applied to an AND gate 232. Pulse signals shown in FIG. 13*c* are derived from an output terminal 253 and are applied to an AND gate 231. Furthermore, the pulse series shown in FIG. 12*b* or FIG. 13*e* synchronized with audio PCM frame period in the MCC signal obtained from synchronizing signal regenerator 16 which is equivalent to the sampling period are applied to an input signal line 909. By applying pulse series as shown in FIG. 12*b* or FIG. 13*e* to a flip-flop circuit 234, the level on its Q output is set as a high level and a signal as shown in FIG. 12*g* or FIG. 13*f* is applied via a signal line 256 to said two AND gates 231 and 232. Assuming now an even channel number had been designated, at first 1 signal is applied to the AND gate 232 from Q output of the flip-flop circuit 301 of the parity check circuit 300. When the pulses shown in FIG. 13*e* are applied to the set input S of the flip-flop circuit 234 of the channel designating circuit 200, the pulses shown in FIG. 13*b* which designate positions of the even channels are applied to a counter 220 after passing the AND gate 232 wherein the number of the pulses is counted. The number of the pulses counted in the counter 220 is compared with the input 1/2 channel number expressed by the input signals on the input signal lines 202–208 by a coincidence circuit 210. When there is a coincidence, the coincidence circuit 210 produces a coincidence pulse which is derived out from an output terminal 915 as a gating out instruction for the audio signal. The coincidence pulse on one hand is returned to the flip-flop circuit 234 to reset it and to stop the input to the counter 220 and on the other hand is fed to the counter 220 to reset it. The reset condition of this counter 220 is not 000 . . . for all the positions, but is made as 111 . . . since it is counted from channel-0.

FIG. 13*f* shows pulse waveform when channel-4 is designated. When the pulses as shown in FIG. 13*e* for starting supply of pulses to the counter 220 are applied to the flip-flop circuit 234, Q output of the flip-flop circuit 234 assumes a high level as shown in FIG. 13*f* and the counter 220 starts counting of the pulses shown in FIG. 13*b* as the present channel is even channel. When just one pulse is fed to the counter 220, the content of the counter 220 becomes 000 . . . , then by the succeeding pulses it becomes 1000 . . . , 0100 . . . and assumes value corresponding to channel-4 as shown in FIGS. 13*a* and 13*b*. On the other hand, in the 8 bit channel number designated from the controller 17, as explained in the foregoing, the least significant position is not used and the signals on the input signal lines 202–208 are used so as to convert the number as 7 bit digit and is supplied to the coincidence circuit 210. Accordingly, the channel-4 is expressed by a number 2 and by counting the pulses shown in FIG. 13*b* as 0, 1, 2 and at the third pulse the coincidence pulse shown in FIG. 13 is produced. By means of this coincidence pulse the gating of the PCM signal is effected and further the flip-flop circuit 234 is reset and the Q output waveform assumes a form as shown in FIG. 13*f.*

As mentioned above, the coincidence pulse is produced at the location of the designated channel number. Therefore by supplying the coincidence pulse to the real-memory designating circuit 100 and the desired PCM audio signal on the designated channel number is gated out by the real-memory gate circuit 500.

As has been substantially explained in the foregoing, in accordance with the present invention, it is possible to continuously reproduce an audio signal on a designated channel by receiving a composite signal in which the video signal and the audio signal are transmitted in time division multiplex, and further an audio signal to be reproduced in the period during which the audio signal is not transmitted is previously inserted in audio signal transmission period in the composite signal as a memory signal.

What is claimed is:

1. A receiver for receiving a composite signal including a first information signal, a second information signal and a control signal having information for processing above said two signals in the receiver being transmitted sequentially in a predetermined sequence, wherein during transmission period of said second information signal the signals to be reproduced in the same period are inserted in the composite signal as real signals, and signals to be reproduced in the period when said second information signal is not transmitted are inserted in the composite signal as memory signals, and for reproducing said second information signal, the receiver comprises;

a means for generating a signal for identifying real or memory of said signal and for selectively deriving the same, a gate means to be controlled by an output signal of said signal generating means, a means for memorizing selectively gated out memory signal by said gate means, a means for directly reproducing said selectively gated out real signal gated by the gate means simultaneously with the reception, and a means for reading out said memory signal stored in the memory means during the period in which the second information signal is not transmitted and for reproducing the memory signal to form a continuous signal together with said reproduced real signal.

2. A receiver for receiving a composite signal including a first information signal, a second information signal and a control signal having information for processing above said two signals in the receiver being transmitted sequentially in a predetermined sequence, wherein during transmission period of said second information signal the signals to be reproduced in the same period are inserted in the composite signal as real signals, and signals to be reproduced in the period when said second information signal is not transmitted are inserted in the composite signal as memory signals, and for reproducing said second information signal, the receiver comprises;

a means for selecting said control signal, a means for deriving said second information signal by using the selected control signal by the selecting means, a means for identifying real or memory signal of the derived out second information signal, a gate means for selectively switching the real signal and the memory signal of the derived out second information signal by using an output signal of said identifying means, a means for memorizing the memory signal selected by said gate means, a means for immediately reproducing the switched real signal by said gate means, and a means for reading out the memory signal stored in the memory means during the period in which the second information signal is not transmitted and for reproducing the memory signal to form a continuous signal together with said reproduced real signal.

3. A receiver for reproducing audio signal from a composite signal comprising a video signal, a time division multiplex audio signal, a control signal including information for processing said two signals in the receiver, and synchronizing signals required for reproducing said signals, being transmitted in a predetermined time interval and in a predetermined sequence, during the transmission period of the audio signal the audio signal to be reproduced in the same period said audio signal is transmitted as a real signal, and the audio signal to be reproduced during a period in which the audio signal is not transmitted is transmitted as memory signal and transmitted together with the real signal in the composite signal, the receiver comprises;

a means for selecting said control signal, a means for deriving out said audio signal by using the selected control signal by the selecting means, a means for identifying real or memory of the derived out audio signal by said means, a gate means for selectively switching the memory signal and the real signal in the derived out audio signal by using an output signal of said identifying means, a means for memorizing said selected memory signal selected by the gate means, a means for immediately reproducing the selected real signal selected by the gate means, and a means for reading out the memorized memory signal in the memory means during the period in which the audio signal is not transmitted and reproducing the read out memory signal in continuous with the real signal.

4. A receiver for reproducing audio signal from a composite signal comprising a video signal, a time division multiplex audio signal, a control signal including information for processing said two signals in the receiver, and synchronizing signals required for reproducing said signals, being transmitted in a predetermined time interval and in a predetermined sequence, during the transmission period of the audio signal the audio signal to be reproduced in the same period said audio signal is transmitted as a real signal, and the audio signal to be reproduced during a period in which the audio signal is not transmitted is transmitted as memory signal and transmitted together with the real signal in the composite signal, the receiver comprises;

a means for selecting said control signal, a means for designating an audio channel to be reproduced by using the control signal selected by the selecting means among the number of multiplex audio signals, a means for deriving out audio signal in the designated channel by said channel designating means, a means for identifying real or memory of the audio signal by using an output signal of the channel designating means, a gate means for selectively switching the real signal and the memroy signal out of the derived out audio signal derived out by said deriving means by using an output signal of the identifying means, a means for memorizing the memory signal gated out by said gating means, a means for immediately reproducing the real signal gated out by said gating means, and a means for reading out the memory signal memorized in the memory means during a period in which the audio signal is not transmitted and for reproducing said memory signal to form a continuous signal together with the reproduced real signal.

5. A receiver as claimed in claim 4, wherein the designating means for designating an audio channel to be reproduced comprises;

a means for representing channel number of the audio channel to be reproduced by $(n+l)$ bit binary digit of $2^0$–$2^n$, a means for designating said audio channel number to be reproduced and expressed by binary digits by converting each digit to be a digit decreased by 1 bit such as digit $2^n$ is to be made as $2^{n-1}$, and a means for making odd-even check of said channel number expressed by the binary digit before said conversion and by using an identification for 0 or 1 of the least significant digit of the channel number.

* * * * *